United States Patent
Murphy et al.

(10) Patent No.: US 10,082,231 B2
(45) Date of Patent: Sep. 25, 2018

(54) CONNECTOR WITH ACTUATABLE REACTION MEMBERS TO RESIST BENDING LOADS

(71) Applicant: FMC TECHNOLOGIES, INC., Houston, TX (US)

(72) Inventors: Richard Murphy, Houston, TX (US); Jasmeet S. Johar, Houston, TX (US); Scott Coltman, Clackmannanshire (GB); Barry Stewart, East Dunbartonshire (GB)

(73) Assignee: FMC Technologies, Inc., Houston, TX (US)

(*) Notice: Subject to any disclaimer, the term of this patent is extended or adjusted under 35 U.S.C. 154(b) by 0 days.

(21) Appl. No.: 15/122,735

(22) PCT Filed: Mar. 31, 2014

(86) PCT No.: PCT/US2014/032411
§ 371 (c)(1),
(2) Date: Aug. 31, 2016

(87) PCT Pub. No.: WO2015/152886
PCT Pub. Date: Oct. 8, 2015

(65) Prior Publication Data
US 2017/0074434 A1 Mar. 16, 2017

(51) Int. Cl.
*F16L 37/00* (2006.01)
*F16L 23/00* (2006.01)
(Continued)

(52) U.S. Cl.
CPC ............ *F16L 23/003* (2013.01); *E21B 17/02* (2013.01); *E21B 33/038* (2013.01); *F16L 23/18* (2013.01); *F16L 37/62* (2013.01)

(58) Field of Classification Search
CPC ........................... F16L 37/1215; F16L 37/138
(Continued)

(56) References Cited

U.S. PATENT DOCUMENTS 2,410,589 A * 11/1946 Segelhorst .............. E21B 19/10
166/75.14
2,737,248 A * 3/1956 Baker .................... E21B 17/043
166/217
(Continued)

FOREIGN PATENT DOCUMENTS

FR 2509784 A1 1/1983

OTHER PUBLICATIONS

International Search Report and Written Opinion dated Nov. 27, 2014, for PCT/US2014/032411 filed on Mar. 31, 2014.
(Continued)

*Primary Examiner* — Aaron M Dunwoody
(74) *Attorney, Agent, or Firm* — Amerson Law Firm, PLLC (57) ABSTRACT

A connector 116 comprised of a body 116A adapted to be positioned adjacent two hubs 112A, 112B, a primary locking means for connecting the two hubs 112A, 112B together and at least one actuatable reaction member 130 that is operatively coupled to the connector body 116A, wherein, when actuated, an inner surface 130S of the at least one actuatable reaction member 130 is urged toward an outer surface 112S of one of the two spaced apart hubs 112A, 112B and wherein a line of travel 133 of the at least one actuatable member 130 is axially spaced apart 134 from a sealing interface that is to be established between the two hubs 112A, 112B.

20 Claims, 7 Drawing Sheets

(51) Int. Cl.
*E21B 33/038* (2006.01)
*F16L 23/18* (2006.01)
*F16L 37/62* (2006.01)
*E21B 17/02* (2006.01)

(58) Field of Classification Search
USPC ........... 285/33, 34, 35, 920, 922; 166/75.14, 166/96.1
See application file for complete search history.

(56) References Cited

U.S. PATENT DOCUMENTS

| | | | | |
|---|---|---|---|---|
| 2,994,381 A * | 8/1961 | Brown | ................... | E21B 43/10 166/125 |
| 3,090,640 A * | 5/1963 | Otteman | ............. | E21B 33/0422 166/75.14 |
| 3,333,870 A | 8/1967 | Watkins | | |
| 4,433,859 A * | 2/1984 | Driver | ................... | E21B 33/038 285/315 |
| 4,771,832 A * | 9/1988 | Bridges | ............... | E21B 33/0422 166/380 |
| 4,902,044 A * | 2/1990 | Williams | .............. | E21B 33/038 166/340 |
| 4,902,045 A | 2/1990 | McGugan et al. | | |
| 5,205,356 A * | 4/1993 | Bridges | ................... | E21B 33/03 166/85.1 |
| 5,299,644 A * | 4/1994 | Eckert | ..................... | E21B 33/03 166/379 |
| 6,035,938 A | 3/2000 | Watkins | | |
| 6,662,868 B1 * | 12/2003 | Van Bilderbeek | .... | E21B 33/038 166/88.2 |
| 7,128,143 B2 * | 10/2006 | Van Bilderbeek | .......................... | E21B 33/0422 166/75.13 |
| 7,416,020 B2 * | 8/2008 | Duhn | ..................... | E21B 33/03 166/75.13 |
| 8,066,064 B2 * | 11/2011 | Minassian | ............... | E21B 33/04 166/138 |
| 8,347,970 B2 * | 1/2013 | Vanderford | ............ | E21B 17/02 166/379 |
| 8,388,255 B2 * | 3/2013 | Larson | .................. | E21B 19/004 285/26 |
| 8,960,276 B2 * | 2/2015 | Lang | ....................... | E21B 33/04 166/75.14 |
| 8,978,772 B2 * | 3/2015 | Yates | ................... | E21B 33/0422 166/348 |
| 9,169,710 B2 * | 10/2015 | Jahnke | ................... | E21B 33/038 |
| 2005/0001427 A1 | 1/2005 | Liew | | |
| 2011/0253388 A1 * | 10/2011 | Willoughby | .......... | E21B 33/035 166/382 |
| 2015/0068725 A1 * | 3/2015 | Duong | .................... | E21B 33/04 166/75.14 |

OTHER PUBLICATIONS

Extended European Search Report dated May 25, 2018, for European Divisional Patent Application No. 18157486.4 filed on Feb. 19, 2018.

* cited by examiner

CONNECTOR WITH ACTUATABLE REACTION MEMBERS TO RESIST BENDING LOADS

BACKGROUND OF THE INVENTION

1. Field of the Invention

The present disclosure generally relates to connectors that are used to establish mating connection between separate hubs, and, more particularly, to a connector with actuatable reaction members to resist bending loads.

2. Description of the Related Art

In many industries a sealing connection must be established between two hubs. Broadly speaking, in much application this may be accomplished by use of a connector that contains a locking means for clamping the two hubs together so as to establish the seal between the two hubs. The structures and configurations of the hubs and the connector, as well as the mechanisms used to establish the sealing connection between such hubs is vast and varied. As one example, in the oil and gas industry, subsea wells normally have a large tubular wellhead positioned at the sea floor. A riser that extends from the wellhead to the surface, e.g., to a drill ship or a platform, is used during at least drilling operations. The riser contains a wellhead connector (a first hub) that is adapted to be coupled to the wellhead (a second hub) by the use of a hydraulically actuated connector. Typically, the sealing connection between the two hubs is established by actuating one or more hydraulic cylinders to force "dogs" into engagement with a profile (e.g., grooves) formed in the outer surface of the wellhead. Another example from the oil and gas industry is subsea flow lines wherein connections must be made between two tubular shaped flow lines that carry hydrocarbon fluids and gases. Of course, there are many industrial applications where such connections must be established that are not in a subsea environment, e.g., refineries and petrochemical plants, onshore drilling operations, etc.

Figure 1A:
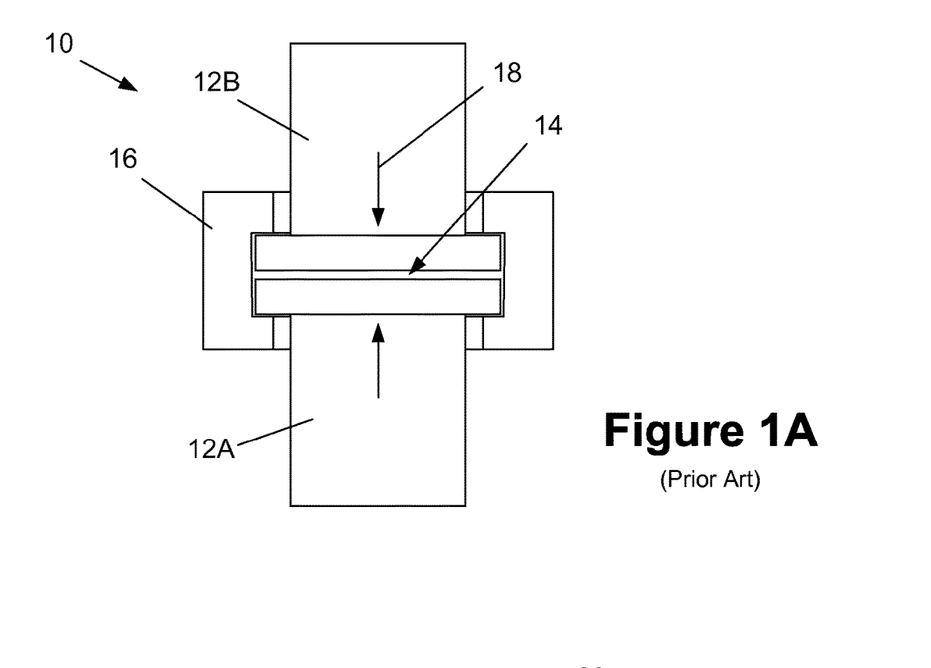
FIGS. 1A-1B are simplistic and schematic drawings of a prior art connector that is used to establish a sealed connection between two hubs.

FIG. 1A is a simplistic and schematic representation of a connection made between two hubs so as to describe one problem encountered when using present day connectors. In general, the system 10 includes first and second hubs 12A/12B wherein a connector 16 is used to establish a seal 14 between the two hubs 12A/12B. The connector 16 is adapted to supply at preload or mating force 18 so as to urge the hubs 12A/12B into sealing engagement with one another. In one embodiment, a seal (not shown), such as a metal seal, is positioned between the two hubs to effectuate such sealing by causing slight deflection of the seal when the mating force 18 is applied. Of course, as will be appreciated by those skilled in the art, there are many forms of hubs, seals and connectors employed within many industries. Moreover, the vertical orientation of the hubs 12A/12B is by way of example only, as they may be oriented in any direction.

Figure 1B:
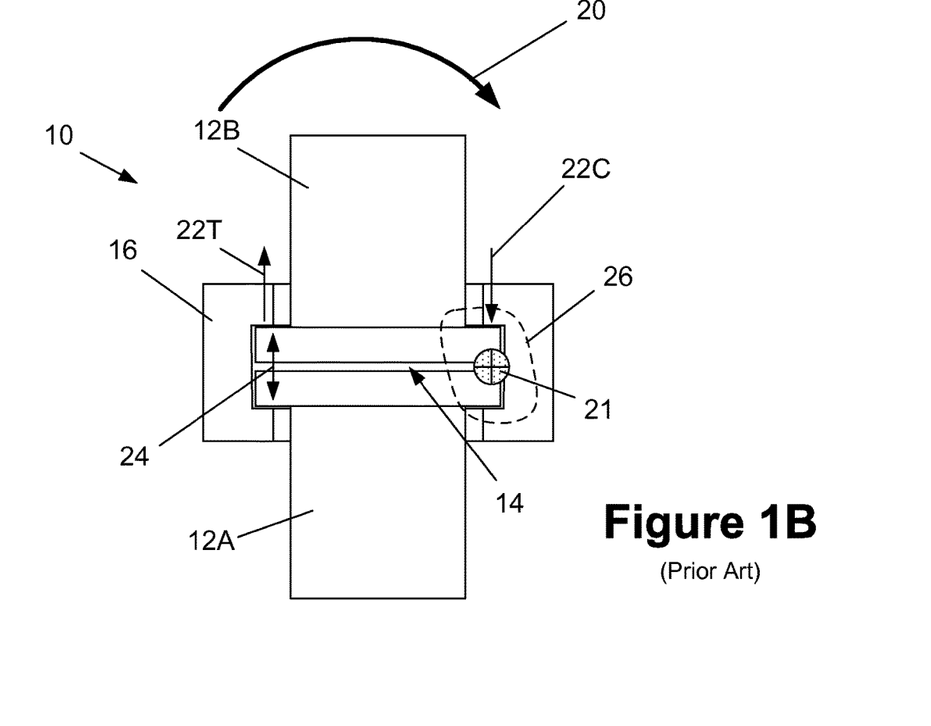

With reference to FIG. 1B, during operation, a bending force or load 20 may be applied to one of the hubs 12A/12B. In the depicted example, the bending force 20 is applied to the top hub 12B. As a result of the bending force 20, the upper hub 12B wants to rotate about the pivot point 21 thereby trying to induce separation (indicated by the double arrows 24) between the two hubs. More specifically, the bending force 20 causes the right side of the connection to experience a compressive force 22C, while the left side of the connection experiences a tensile force 22T.

In an effort to account for these bending loads 20, the connector 16 and/or portions of the hubs 12A/12B are made exceptionally large and robust so that these bending loads may be resisted and the sealed connection 14 is not lost. The connector body must be made sufficiently large and stiff enough so as to withstand all of the loads that it may be reasonably expected to experience during operation, as schematically depicted by the dashed line 26, including the bending force 20. However, using this approach in an effort to account for the bending loads is expensive in that the equipment itself is more expensive and means of handling and positioning such large connectors and hubs in their operating arrangement is more difficult and costly, especially in subsea applications.

The present disclosure is directed to various embodiment of a connector with actuatable reaction members that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various embodiments of a connector with actuatable reaction members to resist bending loads. One device disclosed herein includes, among other things, a body adapted to be positioned adjacent two hubs, primary locking means for connecting the two hubs together and at least one actuatable reaction member that is operatively coupled to the connector body, wherein, when actuated, an inner surface of the at least one actuatable reaction member is urged toward an outer surface of one of the two hubs and wherein a line of travel of the at least one actuatable member is axially spaced apart from a sealing interface that is to be established between the two hubs.

Another illustrative device disclosed herein includes, among other things, a body adapted to be positioned adjacent two hubs, primary locking means for connecting the two hubs together, at least one actuatable reaction member that is operatively coupled to the connector body, wherein, when actuated, an inner surface of the at least one actuatable reaction member is urged toward an operating position wherein it is positioned adjacent but does not contact an outer surface of one of the two hubs and wherein a line of travel of the at least one actuatable member is axially spaced apart from a sealing interface that is to be established between the two hubs and means for actuating the at least one actuatable reaction member.

Yet another illustrative device disclosed herein includes, among other things, a body adapted to be positioned adjacent two hubs, primary locking means for connecting the two hubs together, at least one actuatable reaction member that is operatively coupled to the connector body, wherein, when actuated, an inner surface of the at least one actuatable reaction member is urged toward an operating position wherein it abuts and engages an outer surface of one of the two hubs and wherein a line of travel of the at least one actuatable member is axially spaced apart from a sealing interface that is to be established between the two hubs and means for actuating the at least one actuatable reaction member.

Yet another illustrative device disclosed herein includes, among other things, a body adapted to be positioned adjacent two hubs, primary locking means for connecting the two hubs together and at least one actuatable reaction member that is operatively coupled to the connector body, wherein, when actuated, the at least one actuatable reaction member is urged toward an operating position wherein it abuts and engages both an outer surface of one of the two hubs and an inner surface of the body at a location that is axially spaced apart from a sealing interface that is to be established between the two hubs.

BRIEF DESCRIPTION OF THE DRAWINGS

The disclosure may be understood by reference to the following description taken in conjunction with the accompanying drawings, in which like reference numerals identify like elements, and in which.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present disclosure is generally directed to various embodiments of a connector with at least one actuatable reaction member to resist bending loads and thereby reduce the likelihood of hub separation. With reference to the attached figures, various illustrative embodiments of the methods and devices disclosed herein will now be described in more detail.

FIGS. 2A-2J are simplistic and schematic drawings of a novel connector disclosed herein with one or more actuatable reaction members 130 to resist bending loads. In general, the connection 100 includes first and second hubs 112A/112B wherein a connector 116 is used to establish a seal 114 between the two hubs 112A/112B. The connector 116 is adapted to supply at preload or mating force 118 so as to urge the hubs 112A/112B into sealing engagement with one another. In one embodiment, a seal (not shown), such as a metal seal, is positioned between the two hubs to effectuate such sealing by causing slight deflection of the seal when the mating force 118 is applied. Of course, as will be appreciated by those skilled in the art, there are many forms of hubs, seals and connectors employed within many industries. Thus, the presently disclosed inventions should not be considered to be limited to any particular type of industry, application or devices. Moreover, the vertical orientation of the hubs 112A/112B is by way of example only, as they may be oriented in any direction. The connector 116 typically includes a primary locking means (not shown in FIGS. 2A-2F), i.e., one or more hydraulic piston(s) and one or more "dogs" that engage a profile, i.e., grooves, formed in the outer surface of the hub 112A.

In general, the connector 116 includes a body 116A that has one or more actuatable reaction members 130 positioned in one or more recesses 116B. As will be more fully discussed below, the number, size, spacing and configuration of the actuatable reaction member(s) 130 may vary depending upon the particular application. The actuatable reaction member(s) 130 have an inner surface 130S while the lower hub 112A has an outer surface 112S, e.g., an outer cylindrical surface. In general, an actuation force 132 urges the actuatable reaction member(s) 130 toward the outer surface 112S of the lower hub 112A. In one embodiment, the actuatable reaction member(s) 130 travel radially inward along a line of travel 133 that is axially spaced apart from a sealing interface 135 between the two hubs by a distance 134. The magnitude of the distance 134 may vary depending upon the particular application; however, the line of travel 133 should generally be located below the primary locking means 129 to improve reaction to bending moments 120. In the depicted example, the actuatable reaction member(s) 130 are axially spaced apart from the primary locking interface between the two hubs 112A/112B.

The actuation force 132 may be applied by any desired means, e.g., hydraulic, pneumatic, mechanical, etc. The manner in which components like the novel actuatable reaction member(s) 130 may be urged into a desired operational position are well known to those skilled in the art, e.g., interacting cam surfaces, threaded rods that are rotationally coupled to the one or more actuatable reaction members 130, etc. In one example, the actuation force 132 may be applied to the actuatable reaction member(s) 130 by means of one or more hydraulic pistons. The hydraulic piston(s) used to apply the actuation force 132 may be part of another hydraulic system or it may be part of a dedicated, stand-alone hydraulic system. In one particular embodiment, the actuation force 132 may be supplied using a hydraulic piston that is used to actuate the primary locking means (schematically depicted by lines 129 in FIG. 2A only) between the hubs 112A/112B. In other applications, the actuation force 132 may be a rotational force applied by a remotely operated vehicle (ROV) or by a human operator. In one example, the recesses 116B for the actuatable reaction member(s) 130 may be integrally formed in the body 116A of the connector 116. In another example, the recesses 116B for the actuatable reaction member(s) 130 may be formed in a member 137 (depicted in dashed lines in FIG. 2A only) that is coupled to the body 116, e.g., by threading, welding, etc. For example, in some cases, after the connector is positioned the hubs 112A/B, the member 137 may be threadingly coupled to the body 116A. Under either situation, the actuatable reaction member(s) 130 are considered to be positioned in the body 116A of the connector 116, i.e., the member 137 (when present) is to be considered part of the "body" of the connector 116.

Figure 2A:
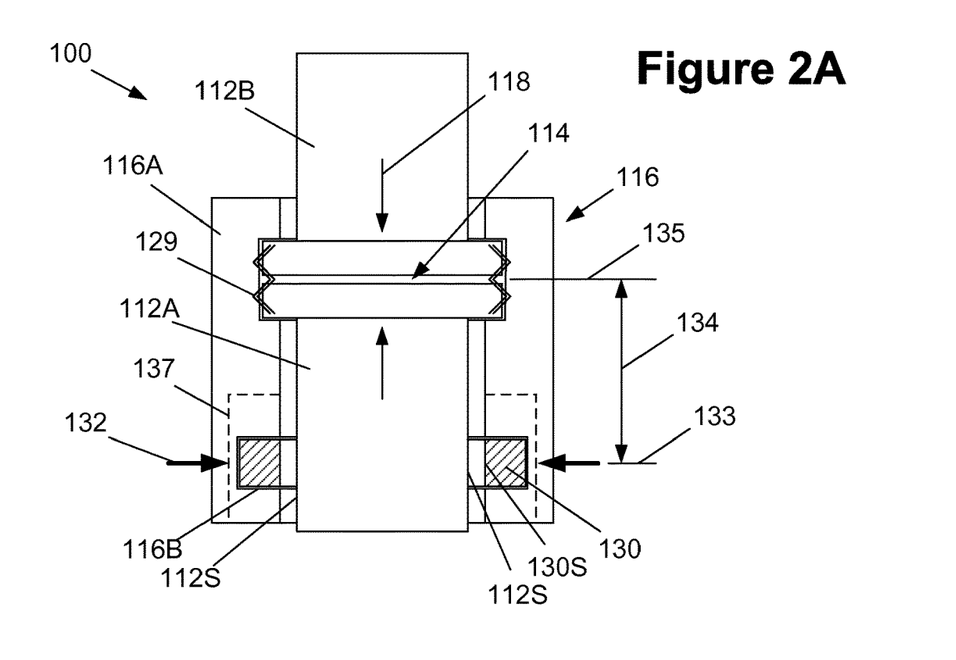
FIGS. 2A-2J are simplistic and schematic drawings of a novel connector disclosed herein with one or more actuatable reaction members to resist bending loads and thereby reduce the likelihood of hub separation.
Figure 2B:
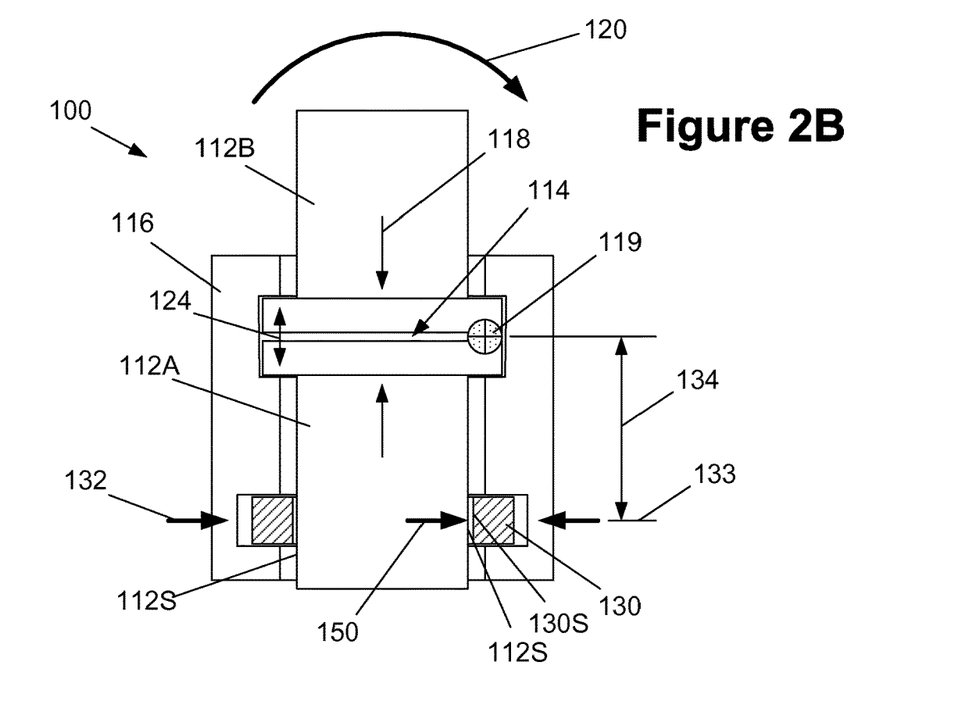

In the situation depicted in FIG. 2A, the actuatable reaction member(s) 130 are in a fully retracted position, i.e., a position when the connector 116 is being initially positioned around the hubs 112A/112B. In the situation depicted in FIG. 2B, the actuatable reaction member(s) 130 have been urged into a partially extended operating position wherein the inner surface 130S of the actuatable reaction member(s) 130 is positioned adjacent but does not contact the outer surface 112S of the lower hub 112A. The magnitude of the spacing between the inner surface 130S actuatable reaction member(s) 130 and the outer surface 112S may vary depending upon the particular application, e.g., 0.005 to 0.060 inches. Note that situation depicted in FIG. 2B is the position of the actuatable reaction member(s) 130 immediately after installation. In operation, when the connector 116 is subjected to a bending load, the various structures depicted FIG. 2B may deflect such at least some portion or number of the actuatable reaction member(s) 130 actually engages and abuts the outer surfaces 112S of the lower hub 112A. In the situation depicted in FIG. 2C, the actuatable reaction member(s) 130 are in a fully extended operational position wherein the inner surface 130S of the actuatable reaction member(s) 130 is purposefully extended to such a distance such that it abuts and engages the outer surface 120S of one of the lower hub 112A.

As indicated above, the number, size, spacing and configuration of the actuatable reaction member(s) 130 may vary depending upon the particular application. In the embodiment depicted in FIG. 2D, the connector disclosed herein employs a single, partial-ring structure, e.g., a C-ring, actuatable reaction member 130. In the embodiments shown in FIGS. 2E and 2F, the connector 116 employs a plurality of partial-ring structures. In some embodiments, the actuatable reaction member(s) 130 have an inner surface 130S that has a radius of curvature 130R that is substantially the same as a radius of curvature 112R (see FIG. 2C) of the outer surface 112S of the lower hub 112A.

Figure 2C:
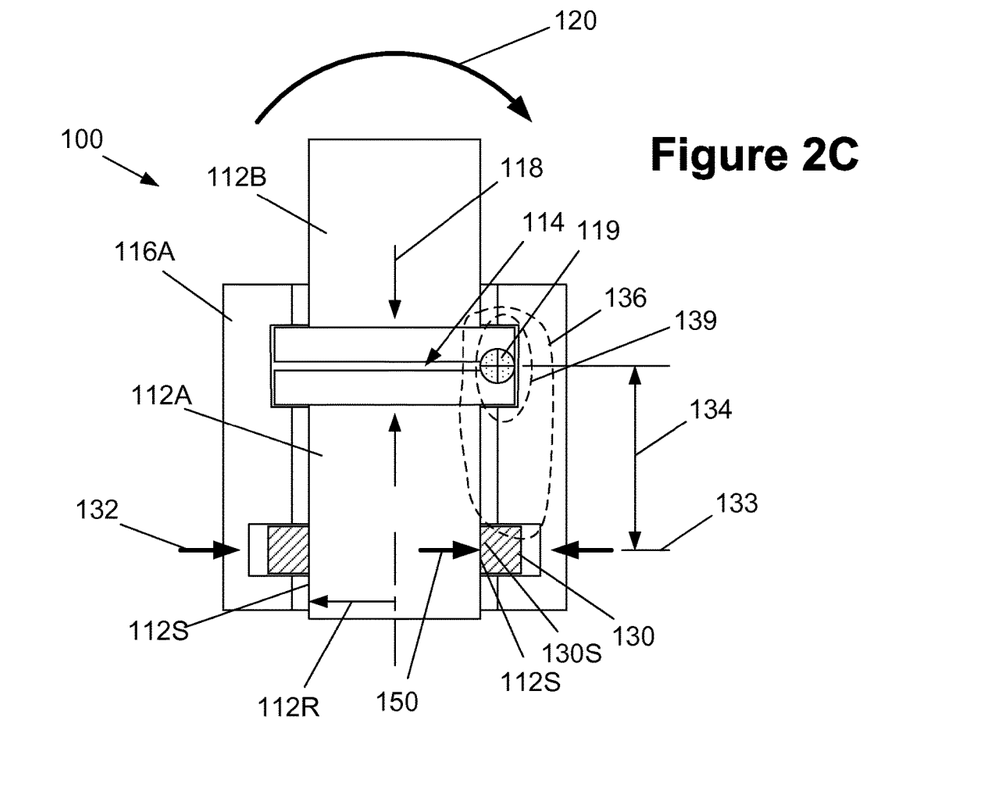
Figure 2D:
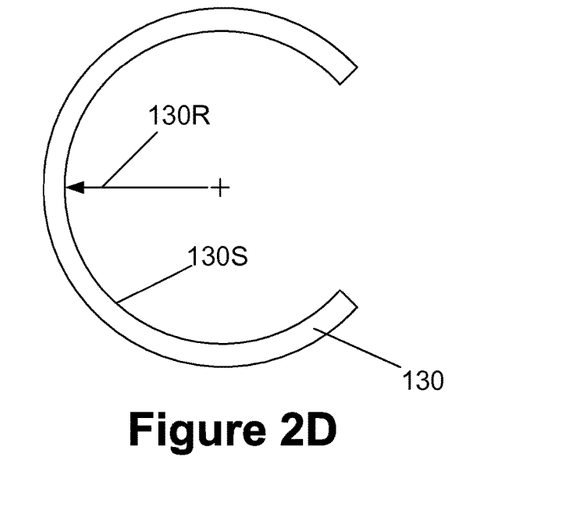
Figure 2E:
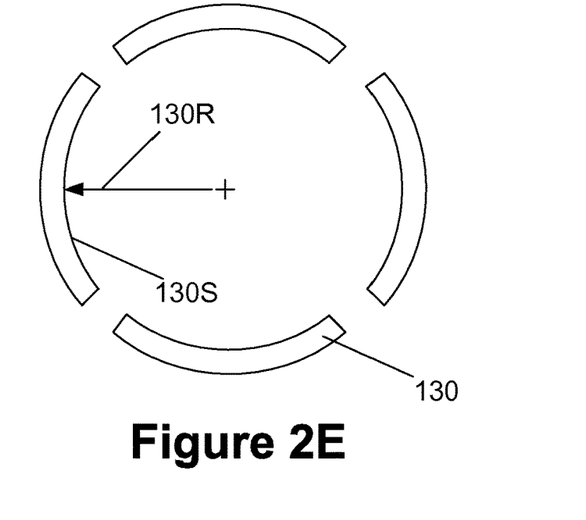
Figure 2F:
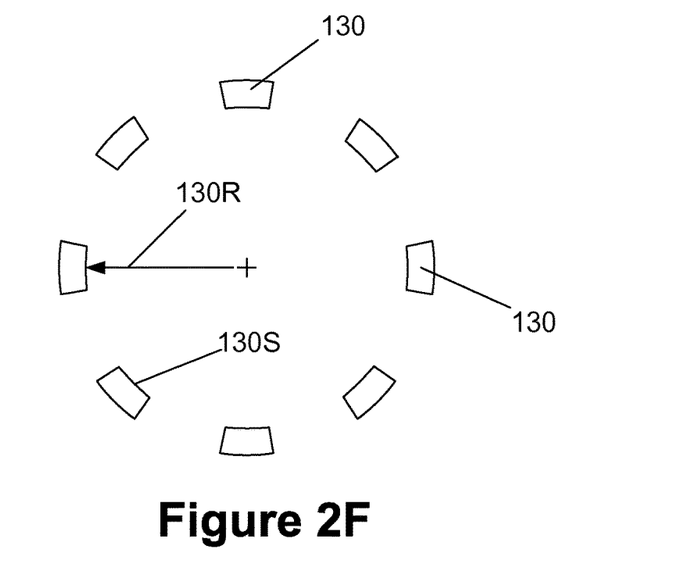
Figure 2G:
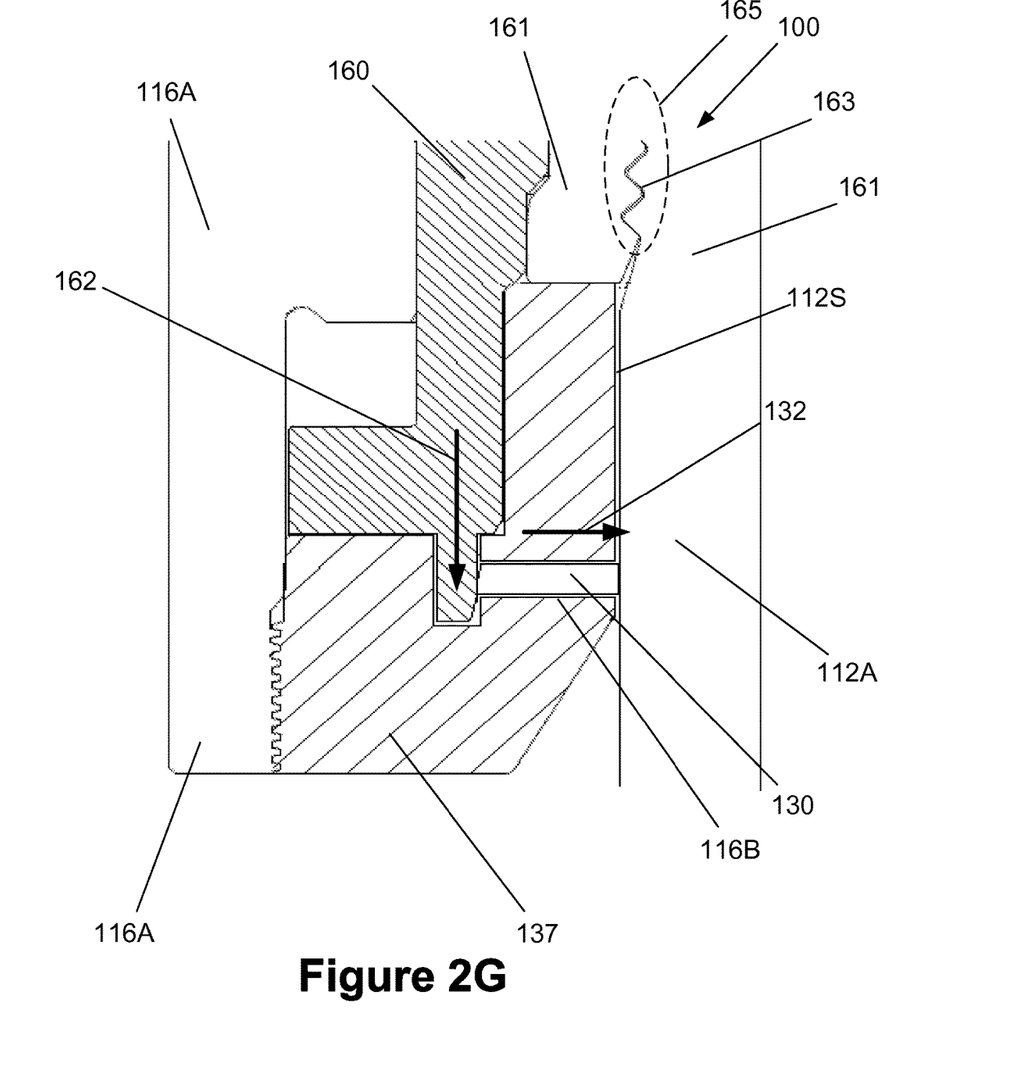

FIG. 2G depicts a particular embodiment of the connector 116 wherein the lower hub 112A is a wellhead. The upper hub 112B may be part of any type of structure that is normally coupled to the wellhead, a riser, a Christmas tree, a blowout preventer, etc. In this example, a hydraulic piston 160 that is used to actuate the primary locking means (schematically depicted by lines 129 in FIG. 2A only) between the hubs 112A/112B is also employed to generate the actuation force 132. In this example, the recesses 116B are formed in a member 137 that is coupled to the body 116A by illustrative threads. In operation, as the piston 160 is urged downward in the direction indicated by the arrow 162, the primary locking means 161 (e.g., dogs) are urged into engagement with a profile 163 formed in the outer surface of the wellhead 112A by the interaction of various cam surfaces. As the piston 160 continues with further downward travel, the piston 160 applies the actuation force 132 by the interaction of cam surfaces on the piston 160 and the actuatable reaction member(s) 130. In the depicted example, this causes the actuatable reaction member(s) 130 to extend and abut and engage the outer surface 112S of the wellhead 112A. Of course, the connector may be designed such that the piston 160 forces the actuatable reaction member(s) 130 into the above-described partially extended operating position wherein the inner surface 130S of the actuatable reaction member(s) 130 is positioned adjacent but does not contact the outer surface 112S of the lower hub 112A.

Figure 2H:
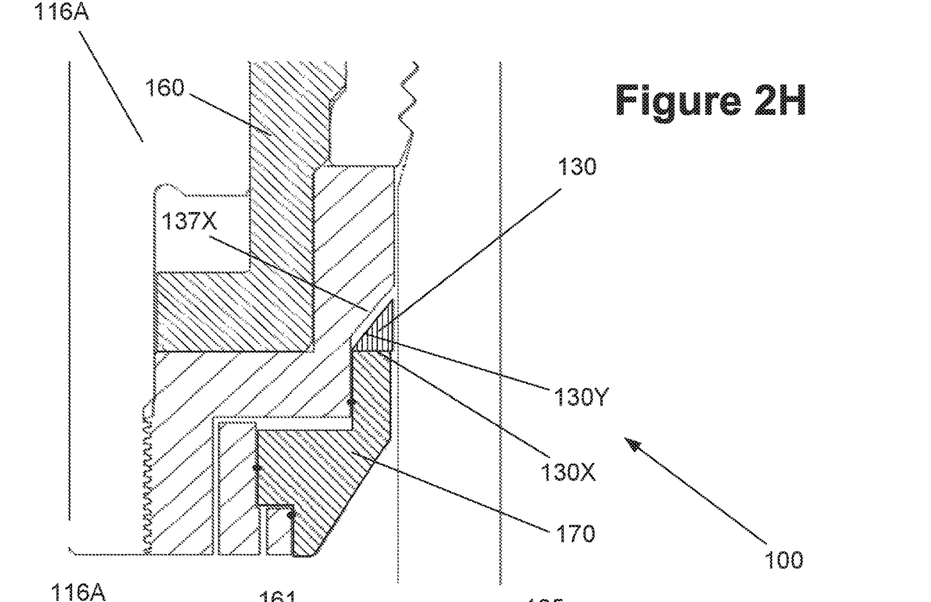
Figure 2I:
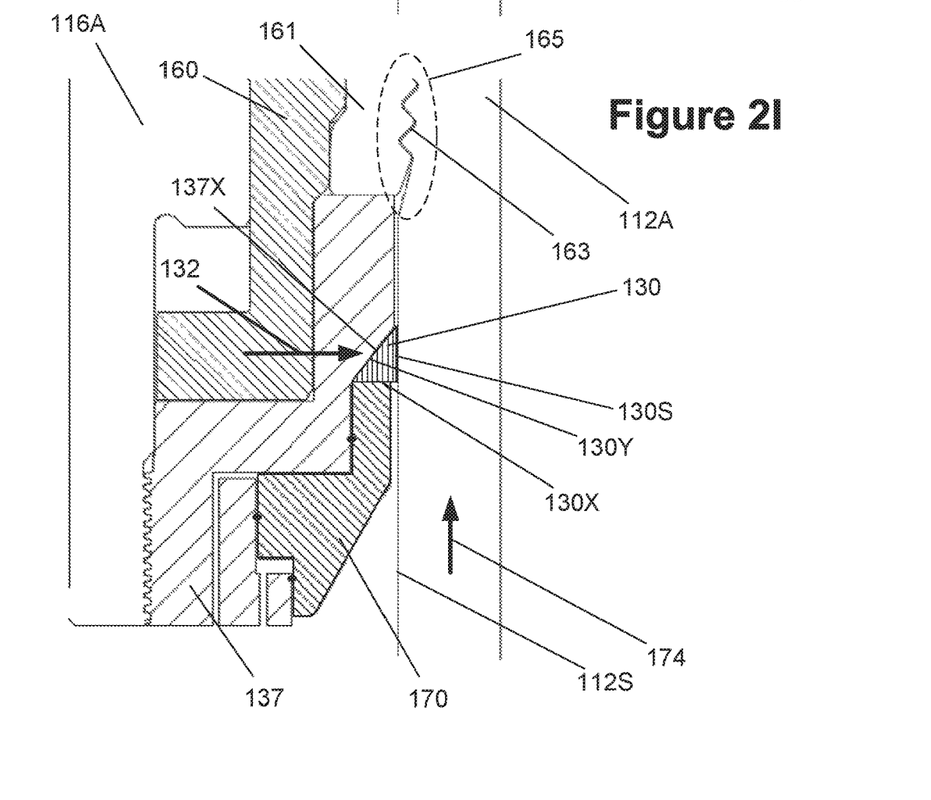

FIGS. 2H-2I depict another particular embodiment of the connector 116 wherein the lower hub 112A is a wellhead. In this example, in addition to the hydraulic piston 160 that is used to actuate the primary locking means between the hubs 112A/112B, a second hydraulic piston 170 is also employed to generate the actuation force 132 on the actuatable reaction member(s) 130. In this example, the actuatable reaction member(s) 130 have a wedge-shaped cross-sectional form. The second piston 170 is positioned in the member 137 that is coupled to the body 116A by illustrative threads. FIG. 2H depicts the connector 116 in the case where the second piston 170 is in a non-actuated state, while FIG. 2I depicts the second piston 170 in a fully actuated state. In operation, the primary piston 160 is first fully extended so that the primary locking means 161 (e.g., dogs) are urged into engagement with a profile 163 formed in the outer surface of the wellhead 112A to thereby establish the primary seal between the two components. At some time thereafter, the second piston 170 is actuated such that the piston 170 travels in the direction indicated by the arrow 174. As the piston 170 continues further upward travel, the piston 170 engages the bottom surface 130X of the actuatable reaction member(s) 130 thereby forcing the tapered surface 130Y of the actuatable reaction member(s) 130 into engagement with a tapered surface 137X formed on the body 137. i.e., the actuatable reaction member(s) 130 is wedged between the body (137) of the connector and the outer surface 112S of the wellhead 112A. The net result of the interaction of the tapered surfaces 130Y and 137X is that an actuation force 132 is generated that causes the inner surface 130S of the actuatable reaction member(s) 130 to abut and engage the outer surface 112S of the wellhead 112A, as shown in FIG. 2I. If desired, the wedged-shaped members 130 could also be urged into a "non-contact" position such as that shown in FIG. 2B. The wedged shaped member 130 may also take the form of any of the partial rings segments depicted in FIGS. 2D-2F, and it may also have an inner surface 130S that has a radius of curvature 130R that is substantially the same as a radius of curvature 112R (see FIG. 2C) of the outer surface 112S of the lower hub 112A. As depicted, in this embodiment the wedge-shaped actuatable reaction member 130 is urged toward an operating position wherein it abuts and engages both the outer surface 112S of the hub 112A and the inner surface 137X of the body at a location that is axially spaced apart from a sealing interface that is to be established between the two hubs 112A-112B. The inner surface 137X of the body is positioned at an angle relative to the outer surface 112S of the hub 112A.

Figure 2J:
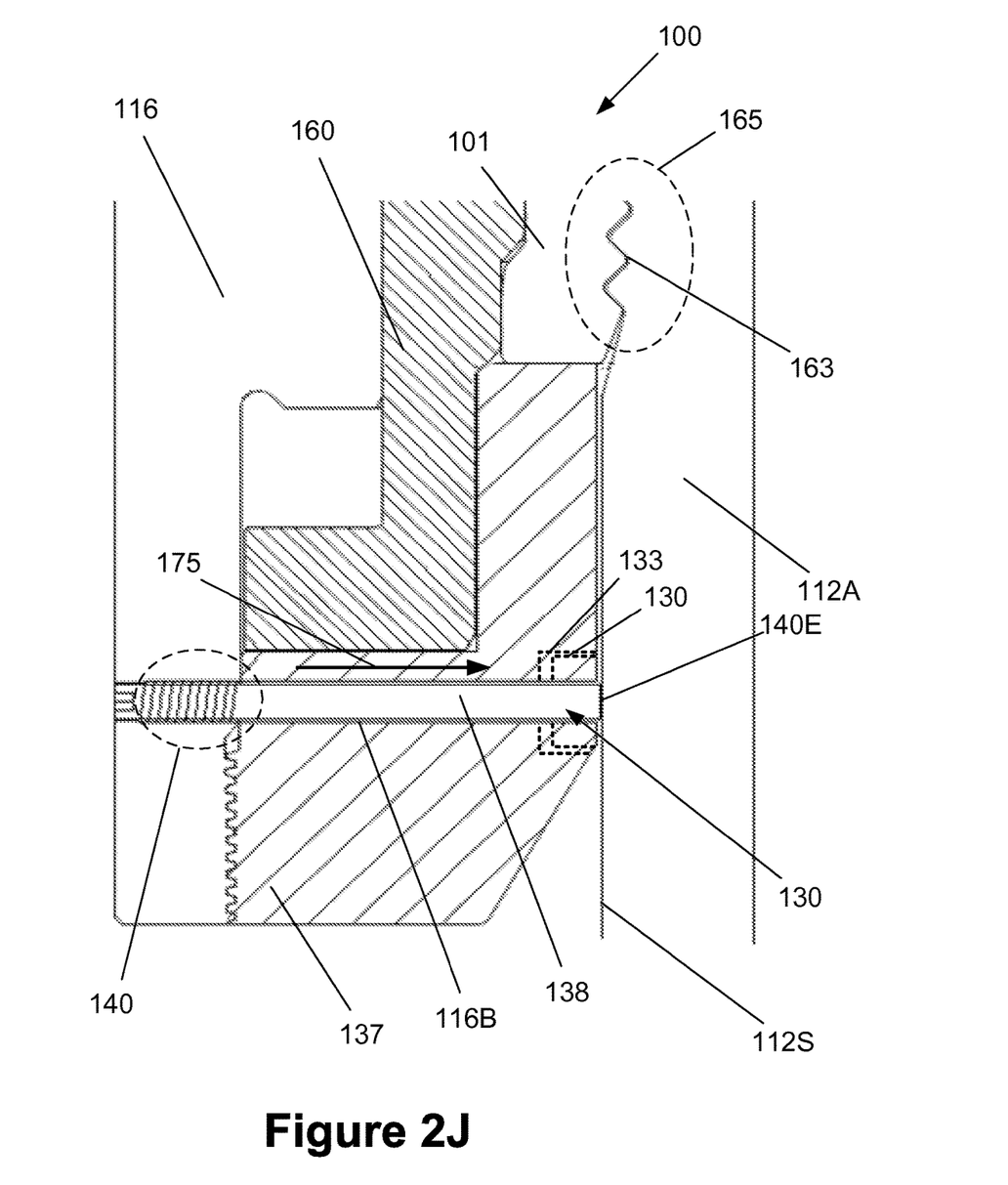

FIG. 2J depicts yet another particular embodiment of the connector 116 wherein the lower hub 112A is a wellhead. In one example, the actuatable reaction member(s) 130 are in the form of a threaded rod 138 that is threadingly coupled to the body 116 by the schematically depicted threads 140. Any number of such threaded rods may be positioned around the perimeter of the connector 116. In another embodiment (depicted in dashed lines in FIG. 2J) one or more of such threaded rods 140 may be rotatably coupled (e.g., a ball and socket arrangement) to the back of each of the actuatable reaction member(s) 130 that are in the form of the partial-ring segments shown in FIGS. 2D-2F and positioned in recesses 133 formed in the body of the connector. In operation, the primary piston 160 is first fully extended so that the primary locking means 161 (e.g., dogs) are urged into engagement with a profile 163 formed in the outer surface of the wellhead 112A to thereby establish the primary seal between the two components. As some time thereafter, the threaded rod 140 may be rotated (by any means, such as a human, an ROV, or by any mechanical means) such that the threaded rod 140 is advanced in the direction indicated by the arrow 175. In the case where the threaded rod 140 is the actuatable reaction member(s) 130, threaded rod 140 is rotated and advanced until the end or inner surface 140E of the threaded rod 140 abuts and engages the outer surface 112S of the wellhead 112A. In the case where one or more of the threaded rods 140 is rotatably coupled to the actuatable reaction member(s) 130 in the form of partial ring segments, the threaded rod 140 is rotated and advanced until the inner surface 130S of the partial ring segments abut and engage the outer surface 112S of the wellhead 112A (as shown in FIG. 2C) or until the inner surface 130S of the partial ring segments are positioned a desired distance away from the outer surface (as shown in FIG. 2B). Of course, in lieu of the piston 170, the threaded rod 140 arrangement shown in FIG. 2J may be readily adapted (e.g., by changing the orientation of the threaded rods) so that one or more of such threaded rods 140 may be used to actuate the wedged-shaped embodiment of the actuatable reaction member shown in FIG. 2J.

With reference to FIGS. 2B and 2C, during operation, a bending force or load 120 may be applied to one of the hubs 112A/112B. In the depicted example, the bending force 120 is applied to the top hub 112B. As a result of the bending force 120, the upper hub 112B wants to rotate about the pivot point 119 thereby trying to induce separation (indicated by the double arrows 124) between the two hubs 112A/B. However, due to the presence of the novel actuatable reaction member(s) 130, the connector 116 is stiffer and better able to withstand the additional loading due to the bending load 120. More specifically, in the case where the actuatable reaction members 130 are positioned in the manner depicted in FIG. 2B, upon deflection of some of the components of the connector 116 and or the hubs 112A/112B, at least some portion or number of the actuatable reaction member(s) 130 actually engages and abuts the outer surfaces 112S of the lower hub 112A thereby generating a reactionary force 150 (see FIG. 2B) at a distance 134 that tend to counteract or resist the bending force 120. In the situation depicted in FIG. 2C, where the inner surface 130S of the actuatable reaction member(s) 130 is purposefully positioned so as to abut and engage the outer surface 120S of the lower hub 112A, the reactionary force 150 is generated upon application of the bending load 120. Thus, through use of the novel connector 116 disclosed herein, including the one or more actuatable reaction members 130, the connector 116 may be made relatively stiffer so as to better withstand and resist the bending loads 120. Additionally, due to the novel aspects of the connector disclosed herein, the connector body may be less massive than prior art connector bodies while still providing the required stiffness to resist bending loads. It should also be noted that, due to the presence of the actuatable reaction member(s) 130, the load distribution in the connector 116, as depicted by the dashed lines 136, 139 shown in FIG. 2C, is more disbursed as compared to the load distribution 26 for the prior art connector 10 shown in FIG. 1B.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed:

1. A connector that is adapted to establish a sealed connection between two hubs, the connector, comprising:
   a body adapted to be positioned adjacent to the two hubs;
   primary locking means for connecting the two hubs together;
   at least one actuatable reaction member that is operatively coupled to the connector body, wherein, when actuated, an inner surface of the at least one actuatable reaction member is urged toward an outer surface of a first hub of the two hubs and wherein a line of travel of the at least one actuatable member is axially spaced apart from a sealing interface that is to be established between the two hubs; and
   at least one hydraulic piston that is adapted to actuate both the primary locking means and the at least one actuatable reaction member, wherein the at least one actuatable reaction member is adapted to be positioned in a first operating position by the at least one hydraulic piston such that the inner surface of the at least one actuatable reaction member contacts and engages the outer surface of the first hub.

2. The connector of claim 1, wherein the at least one actuatable reaction member has a partial-ring structure.

3. The connector of claim 2, wherein the at least one actuatable reaction member is positioned in a recess formed in the body.

4. The connector of claim 1, wherein the at least one actuatable reaction member comprises a plurality of actuatable reaction members.

5. The connector of claim 4, wherein the plurality of actuatable reaction members are spaced-apart partial-ring segments.

6. The connector of claim 1, wherein the inner surface of the at least one actuatable reaction member has a radius of curvature that is substantially the same as a radius of curvature of the outer surface of one of the two hubs.

7. The connector of claim 1, wherein the at least one actuatable reaction member is adapted to be positioned in a second operating position by the at least one hydraulic piston such that the inner surface of the at least one actuatable reaction member is positioned adjacent to but does not contact the outer surface of the first hub.

8. The connector of claim 1, wherein the at least one hydraulic piston comprises a first hydraulic piston that is adapted to actuate the primary locking means and a second hydraulic piston that is adapted to actuate the at least one actuatable reaction member.

9. The connector of claim 1, wherein, while the at least one actuatable reaction member is positioned in the first operating position, the connector is adapted to maintain said sealed connection between the two hubs when a bending moment is imposed on the connector.

10. The connector of claim 7, wherein, while the at least one actuatable reaction member is positioned in the second operating position, the inner surface of the at least one actuatable reaction member is adapted to contact and engage the outer surface of the first hub when a bending moment is imposed on the connector.

11. A connector that is adapted to establish a sealed connection between two hubs, the connector, comprising:
a body adapted to be positioned adjacent to the two hubs;
primary locking means for connecting the two hubs together;
at least one actuatable reaction member that is operatively coupled to the connector body; and
a first hydraulic piston that is adapted to actuate the primary locking means; and
a second hydraulic piston that is adapted to actuate the at least one actuatable reaction member, wherein, when actuated, the at least one actuatable reaction member is urged toward an operating position wherein the at least one actuatable reaction member contacts and engages both an outer surface of one of the two hubs and a surface of the at least one hydraulic piston at a location that is axially spaced apart from a sealing interface that is to be established between the two hubs.

12. The connector of claim 11, wherein the at least one actuatable reaction member is a partial-ring structure.

13. The connector of claim 11, wherein the at least one actuatable reaction member comprises a plurality of actuatable reaction members.

14. The connector of claim 11, wherein the plurality of actuatable reaction members are spaced-apart partial-ring segments.

15. The connector of claim 11, wherein the inner surface of the at least one actuatable reaction member has a radius of curvature that is substantially the same as a radius of curvature of the outer surface.

16. The connector of claim 11, wherein, while the at least one actuatable reaction member is positioned in the operating position, the connector is adapted to maintain said sealed connection between the two hubs when a bending moment is imposed on the connector.

17. The connector of claim 11, further comprising a member coupled to the body and positioned between the first and second hydraulic pistons, wherein, when actuated, the at least one actuatable reaction member further contacts and engages a surface of the member.

18. A connector system, comprising:
a first hub;
a second hub;
a seal adapted to establish a sealing interface between the first and second hubs;
a body adapted to be positioned adjacent to the first and second hubs;
primary locking means adapted to connect the first hub to the second hub and to establish the sealing interface between the first and second hubs;
at least one actuatable reaction member operatively coupled to the body, wherein, when actuated, an inner surface of the at least one actuatable reaction member is urged toward an outer surface of the first hub along a line of travel that is axially spaced apart from the sealing interface between the first and second hubs by a reaction distance, the at least one actuatable reaction member and the reaction distance being adapted to generate a reaction force to a bending moment imposed on the connector system;
a first hydraulic piston that is adapted to actuate the primary locking means; and
a second hydraulic piston that is adapted to actuate the at least one actuatable reaction member.

19. The connector of claim 18, wherein the second hydraulic piston is adapted to position the at least one actuatable reaction member in a first operating position such that the inner surface of the at least one actuatable reaction member is positioned adjacent to but does not contact the outer surface of the first hub, the second hydraulic piston being further adapted to position the at least one actuatable reaction member in a second operating position such that the inner surface of the at least one actuatable reaction member contacts and engages the outer surface of the first hub.

20. The connector of claim 19, wherein, while the at least one actuatable reaction member is positioned in either of the first and second operating positions, the connector system is adapted to maintain said sealing interface between the first and second hubs when said bending moment is imposed on the connector system.

* * * * *